W. C. BURTON.
CUSHION TIRE.
APPLICATION FILED JAN. 7, 1914.
1,185,175.
Patented May 30, 1916.
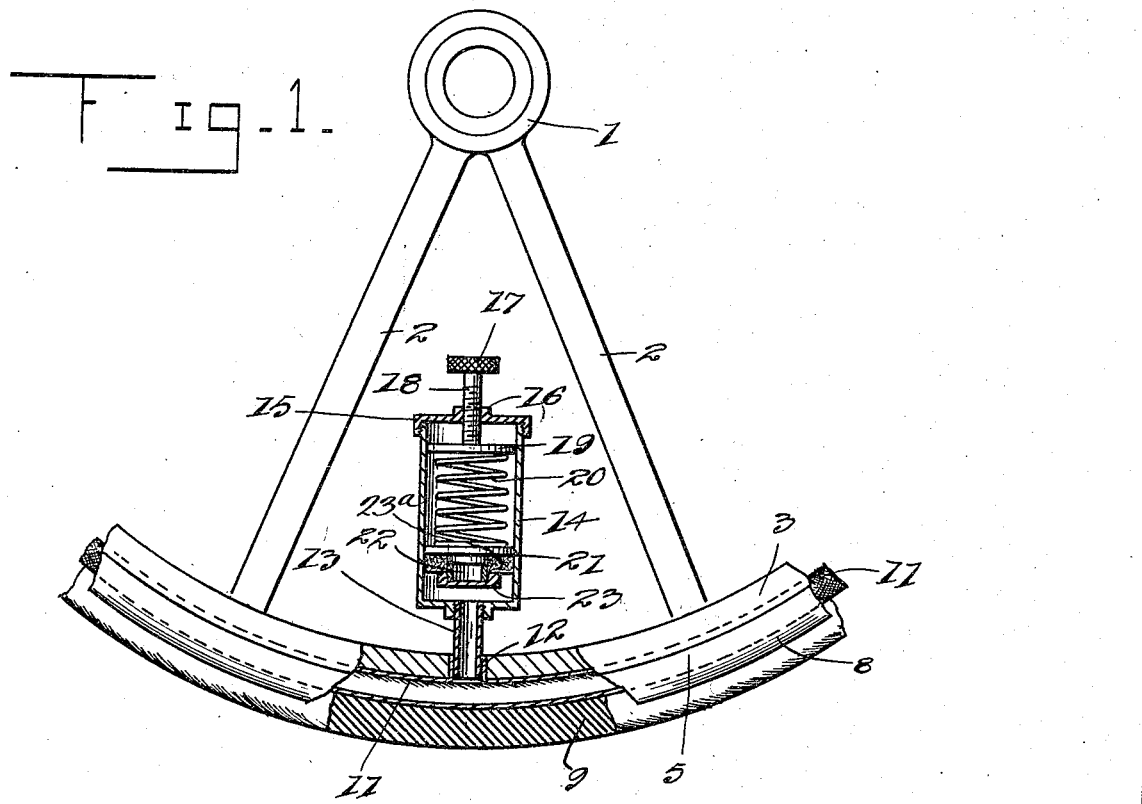
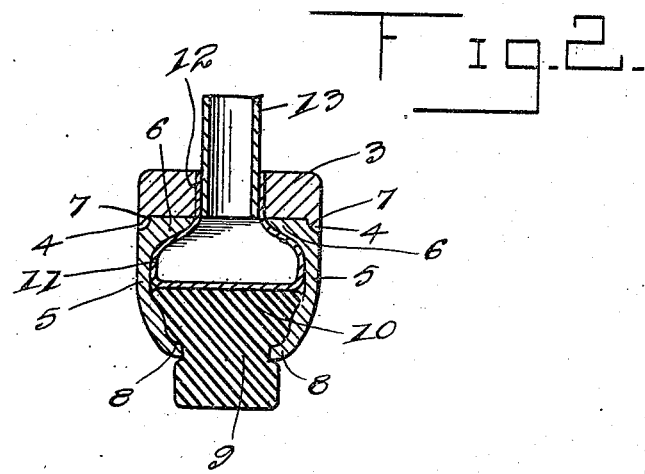
Witnesses
CR Beall.
Inventor
W. C. Burton,
By
Attorney.
THE COLUMBIA PLANOGRAPH CO., WASHINGTON, D. C.

UNITED STATES PATENT OFFICE.

WILLIAM C. BURTON, OF TULLAHOMA, TENNESSEE.

CUSHION-TIRE.

1,185,175.  Specification of Letters Patent.  Patented May 30, 1916.

Application filed January 7, 1914. Serial No. 810,829.

*To all whom it may concern:*

Be it known that I, WILLIAM C. BURTON, citizen of the United States, residing at Tullahoma, in the county of Coffee and State of Tennessee, have invented certain new and useful Improvements in Cushion-Tires; and I do hereby declare the following to be a full, clear, and exact description of the invention, such as will enable others skilled in the art to which it appertains to make and use the same.

This invention relates to cushion tires for automobiles or other vehicles, and one of the principal objects of the invention is to provide simple, reliable and efficient means for preventing the puncturing of tires and to obviate blowouts.

Another object of the invention is to provide an inner tube or pouch designed for giving a yielding action to the outer tire, said inner tube or pouch designed to be filled with oil or other liquid and said tube communicating with a spring actuated plunger for absorbing the shocks or jars incident to the tire.

Another object of the invention is to provide an inner tube or pouch for containing a liquid, and a spring actuated plunger or plungers connected to the inner tube, and means being provided for adjusting the pressure of the spring in the plunger for different loads or different weights of vehicles.

These and other objects may be attained by means of the construction illustrated in the accompanying drawings, in which—

Figure 1 is a fragmentary view of a wheel, showing a cushion tire made in accordance with this invention, parts being shown in section, Fig. 2 is an enlarged transverse sectional view of the cushion tire with spring plunger broken away.

Referring to the drawings the numeral 1 designates the hub of the wheel, 2 are the spokes, 3 is the inner rim, and 4 are the side flanges of the rim 3.

The detachable rim sections 5 are provided with inwardly extending portions 6 having flat upper surfaces which bear against the outer surface of the rim 3, and at their outer edges the sections 5 are provided with grooves 7 to receive the flanges 4 of the rim 3. The outer edges 8 of the rim sections 5 engage a solid rubber tire 9, the inner surface 10 of which is preferably flat as shown in Fig. 2.

An inner tube or pouch 11 preferably formed of linen or other suitable material, is confined between the rim sections 5 and the rubber tire 9, as shown in Fig. 2, said inner tube being preferably filled with oil or other liquid, and provided at suitable intervals between the spokes 2 with a discharge nipple 12 which extends through a suitable opening in the inner rim 3 and is connected to a tube 13.

A casing 14 has the tube 13 connected to its end and communicates with the interior of said casing. A screw cap 15 is fitted to the opposite end of the casing 14, and is provided with a screw threaded boss 16. A screw 17 having a screw threaded stem 18 mounted in the threaded boss 16, is provided with a plate or disk 19 disposed within the casing 14. A spiral spring 20, mounted within the casing 14, has one of its ends bearing against the disk 19, while the opposite end bears against a plunger 21, and the plunger 21 is provided with a hollow extension 22 fitted with a cap 23, to hold the packing 23 in place.

From the foregoing it will be obvious that the pressure upon the rubber tire 9 will cause the liquid in the tube or pouch 11 to run up through the tube 13 into the casing 14 and compress the spring 20, thus giving a yielding action to the tire. The tension of the spring 20 may be adjusted by turning the screw 17. It will be obvious that the tube 11 and the spring plunger may be utilized as an ordinary inner tube for use with an ordinary outer tire.

The invention is simple in construction and is reliable and efficient in use.

What is claimed is:

A cushion tire comprising a rim having an opening extending therethrough, rim sections secured to the rim and extending outwardly therefrom, a tire mounted between the rim sections and having its inner side spaced from the rim, a pouch located within the rim sections and between the tire and rim, a nipple connected to and communicating with the pouch, said nipple entering the opening in the rim, a casing having a side and end walls, a tube establishing communication between the pouch and casing, said tube having one end secured in the nipple and its other end secured in one of said end walls, a plunger movable within the casing, a disk movable within the casing, a spiral spring located within the casing between the plunger and disk, a spring adjusting screw passing through and having screw threaded connection with the other end wall of said casing, the inner end of the screw engaging the disk, and a liquid within the pouch.

In testimony whereof I affix my signature in presence of two witnesses.

WILLIAM C. BURTON.

Witnesses:
   HUGH LEDFORD,
   O. C. RICHARDSON.

Copies of this patent may be obtained for five cents each, by addressing the "Commissioner of Patents, Washington, D. C."